(12) United States Patent
Tosey

(10) Patent No.: US 7,100,203 B1
(45) Date of Patent: Aug. 29, 2006

(54) OPERATING SESSION REAUTHORIZATION IN A USER-OPERATED DEVICE

(75) Inventor: Joseph Tosey, North Vancouver (CA)

(73) Assignee: Glenayre Electronics, Inc., Charlotte, NC (US)

( * ) Notice: Subject to any disclaimer, the term of this patent is extended or adjusted under 35 U.S.C. 154(b) by 0 days.

(21) Appl. No.: 09/551,919

(22) Filed: Apr. 19, 2000

(51) Int. Cl.
G06F 7/04 (2006.01)
G06F 12/00 (2006.01)
G06F 13/00 (2006.01)
G06K 19/00 (2006.01)
H04L 9/32 (2006.01)

(52) U.S. Cl. .................. 726/17; 726/2; 726/4; 726/18; 726/19; 713/167; 713/183; 713/320; 713/323

(58) Field of Classification Search ........ 713/200–202, 713/323, 401, 168, 182–186, 167, 320; 340/5, 340/541, 686; 455/411; 705/71–79; 711/164; 726/2, 16, 17–19
See application file for complete search history.

(56) References Cited

U.S. PATENT DOCUMENTS

| | | | | |
|---|---|---|---|---|
| 5,664,097 A | * | 9/1997 | Johnson et al. | 713/200 |
| 5,682,475 A | * | 10/1997 | Johnson et al. | 713/202 |
| 5,835,083 A | * | 11/1998 | Nielsen et al. | 345/211 |
| 5,875,345 A | * | 2/1999 | Naito et al. | 713/323 |
| 5,958,055 A | * | 9/1999 | Evoy et al. | 713/310 |
| 6,002,427 A | * | 12/1999 | Kipust | 348/156 |
| 6,111,517 A | * | 8/2000 | Atick et al. | 340/5.83 |
| 6,121,962 A | * | 9/2000 | Hwang | 345/211 |
| 6,209,104 B1 | * | 3/2001 | Jalili | 713/202 |
| 6,282,553 B1 | * | 8/2001 | Flickner et al. | 708/141 |
| 6,330,676 B1 | * | 12/2001 | Kelsey | 713/200 |
| 6,360,326 B1 | * | 3/2002 | Hiles | 713/202 |
| 6,374,145 B1 | * | 4/2002 | Lignoul | 700/17 |
| 6,510,415 B1 | * | 1/2003 | Talmor et al. | 704/273 |
| 6,560,711 B1 | * | 5/2003 | Given et al. | 726/34 |
| 6,715,086 B1 | * | 3/2004 | Himmel et al. | 713/202 |

OTHER PUBLICATIONS

System Mode Transition with Notification and Adaption, IBM Technical Disclosure Bulletin, vol. 38, No. 09, Sep. 1995.*
IBM Technical Disclosure Bulletin, "Hardware Monitor Security Feature" Aug. 1989, vol. 32, pp. 284-285.*
Landweher, Carl "Protecting Unattended Computers Without Software" IEEE 1997.*

* cited by examiner

Primary Examiner—Hosuk Song
Assistant Examiner—Beemnet W Dada
(74) Attorney, Agent, or Firm—Merchant & Gould P.C.; Mark R. Hennings

(57) ABSTRACT

An authorization-update process for use in a user-operated device re-authorizes an operating session after a rapid idle timeout using the authorization-update process, which has fewer steps than a normal authorization process. The re-authorization process can require only a single entry or input event by the user in response to a prompt by the device to re-authorize the user and continue to the operating session. Thus, the authorization-update process is significantly faster than re-authorization in the conventional manner. In one embodiment, the prompt includes a display of several characters. The user selects a predetermined character to re-authenticate the user, thereby continuing the operating session from the same point at which the idle timeout occurred. In a further aspect, the user has a predetermined time period to select the correct character to continue the operation session. Not meeting the time requirement or selecting a wrong character or icon will cause the device to require a full authorization process to enable the user to operate the device. Alternatively, the authorization update process may use the position of the cursor or a voice signal to re-authorize the operating session.

36 Claims, 2 Drawing Sheets

```
    ⎧ abcdefghijklmnopqrst
    ⎪ uvwxyz< >( )0123456789
30 ⎨ ABCDEFGHIJKLMNOPQRST
    ⎩ UVWXYZ{ }[ ] !@ # $ % ^& *_+
```

OPERATING SESSION REAUTHORIZATION IN A USER-OPERATED DEVICE

FIELD OF THE INVENTION

The present invention relates to user-operated devices and, more particularly, to authorization processes for use in user-operated devices.

BACKGROUND INFORMATION

Some personal electronic devices such as, for example, personal computers (PCs), personal digital assistants (PDAs), and mobile phones include authentication processes to help ensure that only authorized users can operate the device. This feature is often used to prevent others from accessing confidential information available through the device and/or accumulating service charges for using the device (e.g., cell phones).

Some conventional authentication processes include (a) multi-step login processes, (b) biometrics units that can determine whether the user is authorized by sensing a physical feature of the user, and (c) security devices (e.g., encryption ring) that are physically carried by the user to "unlock" the personal computing device.

Currently, the multi-step login process is widely used. Typically, the multi-step login process begins when the device is powered on or reset. The device then prompts the user to enter a login name and password via a user interface (e.g., keyboard or keypad) before allowing the user to otherwise operate the device. Generally, the login name and the password must each include several characters. Using the user interface, the user then enters the several characters of the user's login name, and then enters the several characters of the password. This process typically takes a relatively long time since the user must enter each character for the login name, move the cursor to another field for the password and then enter each character of the password. The device must then process the login name and password to determine if the user is an authorized user. If the user is an authorized user, the device then starts an operating session in which the user can operate the device in the normal manner.

An additional security feature of the multi-step login process is that the operating session will be terminated if the user does not operate the device for an extended period of time (sometimes referred to as an idle timeout). Once this occurs, in the conventional system, the user must then repeat the entire authorization period. As will be appreciated by many users, this process can be undesirable because the delay disrupts the user's train of thought and may even cause the device to enter a default "start-up" mode, leaving the state the device was in when the idle timeout occurred. Thus, it is desirable to implement a system in which a user can quickly and easily continue an operating session after an idle timeout.

SUMMARY

In accordance with the present invention, an authorization-update process for use in a user-operated device is provided. According to one aspect of the present invention, an operating session of the user-operated device can be re-authorized after an idle timeout using the authorization-update process, which has fewer steps than the initial authorization process. In a further refinement, the re-authorization process requires only a single entry by the user in response to a prompt by the device to re-authorize the user and continue to the operating session. Thus, the authorization-update process is significantly faster than re-authorization in the conventional manner. In one embodiment, the prompt includes a display of several characters or icons. The user then selects the character or icon that was preselected to re-authenticate the user, thereby continuing the operating session from the same point at which the idle timeout occurred. In a further aspect, the user has a predetermined time period to select the correct character or icon to continue the operation session. Not meeting the time requirement or selecting a wrong character or icon will cause the device to require a full authorization process to enable the user to operate the device. This aspect of the invention allows the user to quickly and easily re-authenticate the operating session, thereby avoiding significant disruptions in the operating session. Alternatively, the authorization update process may use the position of the cursor or a voice signal to re-authorize the operating session.

DETAILED DESCRIPTION

Figures 1, 3:
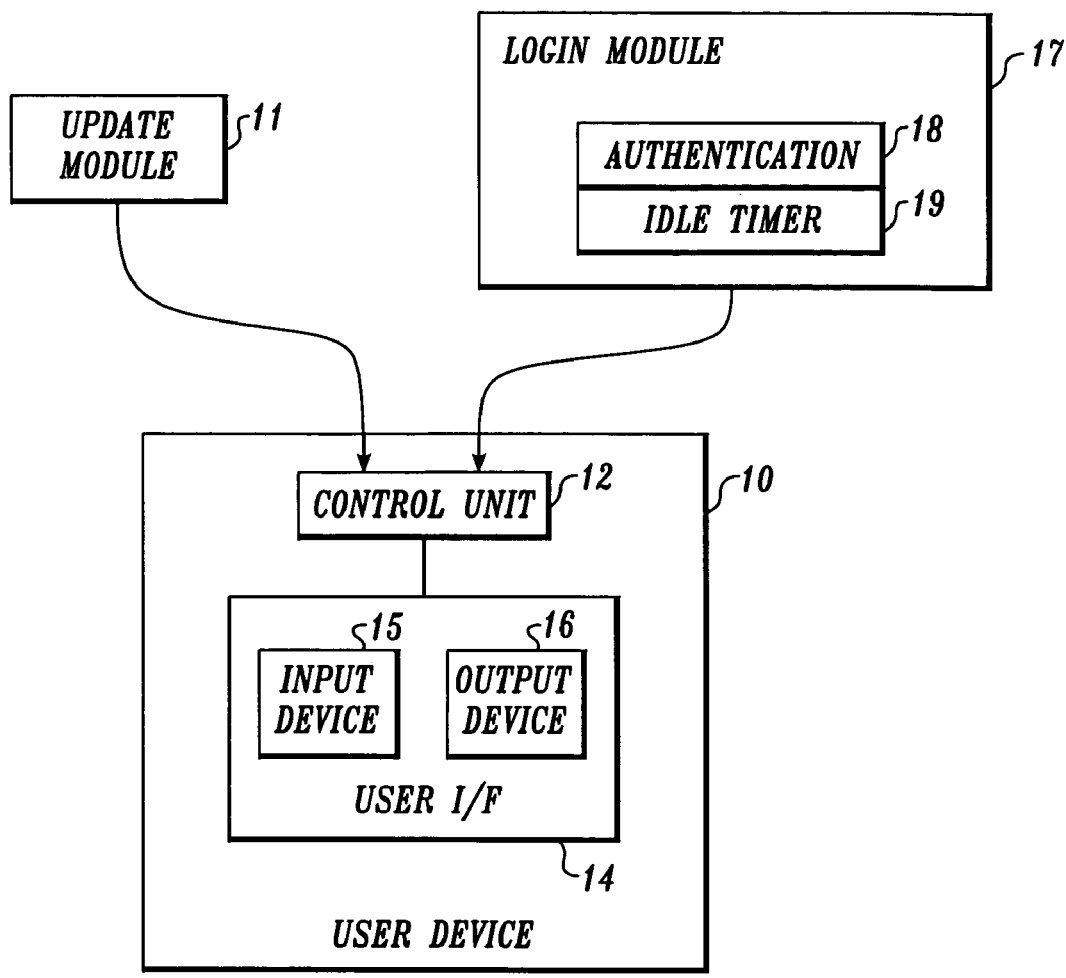
FIG. 1 illustrates a block diagram of a user-operated device with an authorization-update module, according to one embodiment of the present invention.
FIG. 3 illustrates a prompt for the authorization-update module, according to one embodiment of the present invention.

FIG. 1 a user-operated device 10 with an authorization-update module 11, according to one embodiment of the present invention. The authorization-update module is described below in conjunction with FIG. 2. The term module is used herein can refer to software or hardware implementations of an authorization-update process. The user-operated device 10 can be a computer system, a PDA, a cell phone, or other electronic device that is to be operated by a user in authenticated operating sessions.

In this embodiment, the user-operated device 10 includes a control unit 12 and a user interface 14. The user interface 14 includes an input device 15 and an output device 16. For example, the input device 15 may be a keyboard or keypad, whereas the output device 16 may be a display such as a monitor or liquid crystal display (LCD). In addition, the input and output devices 15 and 16 may include a microphone and speaker for interfacing with the user in audio signals (e.g., voice recognition and activation techniques).

In this embodiment, the control unit 12 is also configured with a login module 17, similar to conventional login modules. The login module 17 includes an authentication module 18 and an idle timer 19. The idle timer 19 counts the time from the last time the user operated the device (e.g., operated the user interface). For example, the input device 15 may be a keypad, which resets the idle time each time the user activates a key. The control unit 12 monitors the idle timer 19 and detects when the predetermined idle timeout has been reached.

Figure 2:
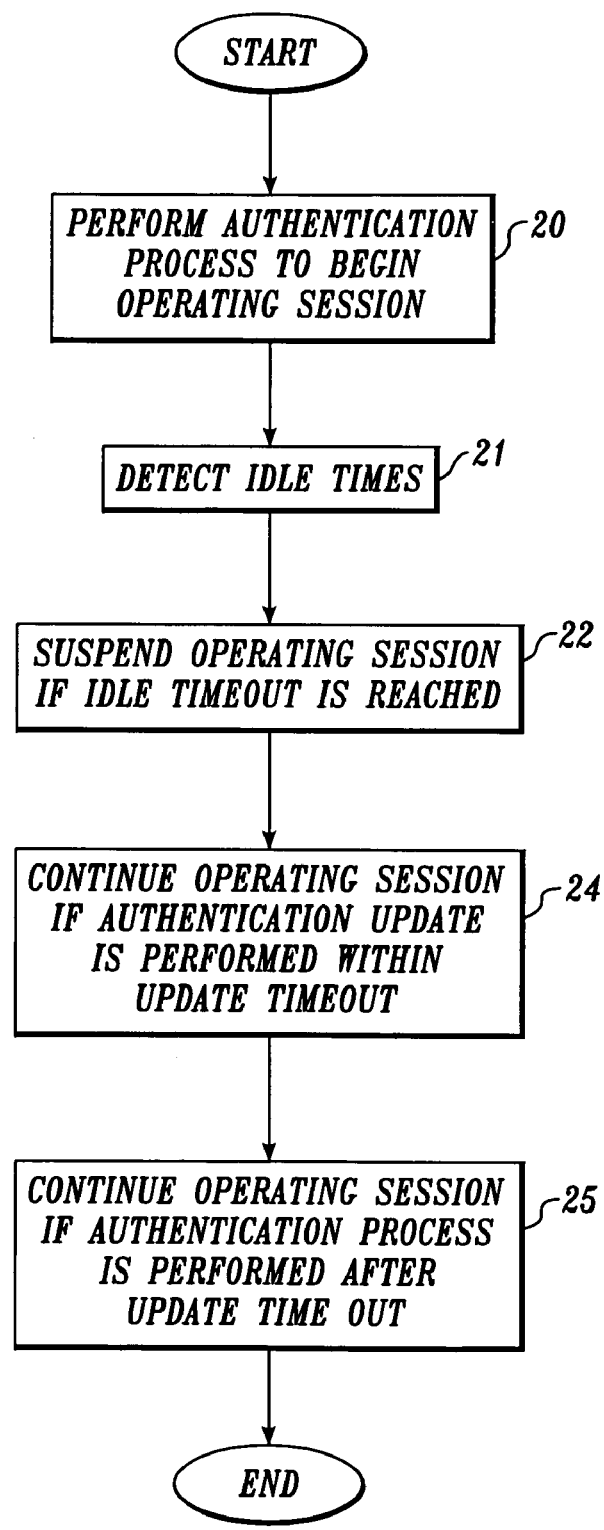
FIG. 2 illustrates a flow diagram of the operation of the user-operated device of FIG. 1, according to one embodiment of the present invention.

FIG. 2 illustrates the operation of the user-operated device 10 (FIG. 1), according to one embodiment of the present invention. Referring to FIGS. 1 and 2, user-operated device 10 operates as follows. In an operation 20, the user-operated device performs the authentication process. In this embodiment, the login module 17 prompts the user for a login name and password, as in some conventional user-operated devices. In response thereto, the user provides the login name and password, which the control unit 12 then verifies. If the user is an authorized user, the operation flows to operation 21. In operation 21, the control unit 12 monitors the idle timer 19 to detect when the user has left the device idle for a predetermined time period. In this embodiment, this predetermined time period is referred to as the rapid idle timeout. For example, the rapid idle timeout may be about ten minutes. In this embodiment, the rapid idle timeout is configurable, with values commonly ranging from one to thirty minutes or more. The rapid idle timeout can be configured by the user, at manufacture, etc.

In a next operation 22, if the rapid idle timeout is reached, the control unit 12 causes the user-operated device to enter a suspend mode, in which the operating session is suspended. In the suspend mode, the user-operated device will not respond to normal commands/input events via the user interface 14, but rather proceeds to an operation 24.

In operation 24, the update module 11 determines whether the user is still the authorized user. For example, the rapid idle period may have occurred because the authorized user is no longer in the vicinity, leaving the user-operated device 10 unattended. An unauthorized user may then attempt to operate the device 10. The update module 11 prevents a user from operating the device after the rapid idle timeout has been reached unless the user provides an authentication-update event within a second predetermined time period (i.e., the update timeout). One embodiment of an update-authorization event is described below in conjunction with FIG. 3. In this embodiment, the rapid idle timeout is about ten minutes and the update timeout is about five seconds. If the authorization-update process in properly completed, the idle timer 19 is reset and the operational flow returns to operation 21. In accordance with the present invention, the update authorization process is significantly less complex than the authorization process of operation 20. This feature advantageously allows the authorized user to continue the operating session without significant delay, without losing the current state of the user-operated device 10 and without losing the user's thought process.

If the authorization-update process is not properly completed within a third predetermined time period (normal idle timeout), a next operation 25 is performed. In operation 25, the operating session cannot be continued unless the login module 17 determines the user is an authorized user as described in operation 20. Thus, if the user-operated device 10 has been idle for a period less than the normal idle timeout but greater than the rapid idle timeout, operation 24 is performed to continue the operating session. However, if the user-operated device 10 has been idle for greater than the normal idle timeout, then operation 25 is performed to continue the operating session.

In alternative embodiment, if user does not perform the full authorization process with a fourth predetermined time period (powerdown idle timeout), the device enters a standby or inactive mode, in which the device can be shut down or placed in some other energy saving mode. The user must then perform some additional step or steps to proceed to operation 20. For example, the normal idle timeout may be one hour and the powerdown idle timeout may be five hours. Thus, in this example, the user may perform operation 25 to continue the operating session if the user-operated device has been idle for more than the normal idle timeout but less than the powerdown idle timeout. If the device is idle for more than the powerdown idle timeout, the user may be required to restart the user-operated device 10, after which the operational flow returns to operation 20.

FIG. 3 illustrates a prompt for the authorization-update module 11 (FIG. 1), according to one embodiment of the present invention. In this embodiment, the user interface 14 (FIG. 1) implements the input device 15 (FIG. 1) so as to include a mouse (not shown), and the output device 16 (FIG. 1) to include a monitor (not shown) that can display characters and a cursor. After the rapid idle timeout, the authorization-update module 11 causes the user interface 14 to display characters 30, as a prompt for the authorization-update process. In one embodiment, the prompt is displayed when the user tries to operate the user-operated device 10 after the operating session was suspended. In response to the prompt, the user would then select or "click" a predetermined character that is being displayed, within the update timeout, to properly complete the authorization-update process. In this example, there are eighty characters 30, thereby significantly decreasing the chance (i.e., one in eighty) that an unauthorized user will randomly select the proper authorization-update response. In an alternative embodiment, the authorization-update process may require the selection of two predetermined characters as the proper response. Thus, the probability of randomly selecting the correct two characters becomes $1/[(80)(79)]$. The user may also press the appropriate key of a keyboard (not shown) instead of using the cursor to select the predetermined character. Of course, in other embodiments, a different number of keyboard characters may be used. In addition, characters that are not commonly part of a keyboard can also be displayed. Still further, a plurality of icons, or a combination of icons and characters can be displayed. The user would then have to select the predetermined character or icon within the update timeout to complete the authorization-update process.

In yet another embodiment (not shown), the user interface 14 may also include a microphone, which is used to receive an acoustic voice signal from the user. In this alternative embodiment, the user would utter a predetermined word or phrase into the microphone to engage in the authorization-update process. The control unit 12 includes a voice recognition module (not shown) that determines whether the user is an authorized user. In this embodiment, the user would choose the predetermined word or phrase and train the voice recognition module to recognize the user's pronunciation. This embodiment significantly increases the number of possible predetermined responses to an authorization-update prompt.

In yet another alternative embodiment, the predetermined response is the placement of the cursor at a predetermined point on the monitor within the update timeout. Merely placing the cursor at this point, or alternatively, clicking on this point serves as the response to the prompt. The prompt itself may be an acoustic signal (e.g., a beep or other sound, or a phrase requesting the authorization-update response) in these alternative embodiments. Still further, the display of a screen saver may serve as the prompt in these embodiments.

In still another alternative embodiment, the predetermined response is the user looking at a predetermined character or icon displayed by the user interface, or a predetermined location on a monitor of the user interface. The user-operated device includes a unit that monitors the user's eye or eyes and determines which point on the monitor that the user is viewing. For example, the Eyegaze technology available from LC Technologies, Inc., Fairfax, Va. can be used.

The foregoing embodiments are intended to be illustrative of the principles of the present invention and are not intended to limit the invention to the particular embodiments described. Accordingly, while the preferred embodiment of the invention has been illustrated and described, it will be appreciated that various changes can be made therein without departing from the spirit and scope of the invention.

I claim:

1. A method of authorizing a user to operate a user-operated device, the method comprising:
   performing an authentication process to start an operating session;
   detecting when the user is not operating the user-operated device;
   suspending the operating session if the user has not operated the user-operated device for a first predetermined period;
   continuing the operating session if the user performs an authentication-update process within a second predetermined time period after the operating session is suspended, wherein the authentication-update process comprises selection of at least two predetermined characters by the user; and
   continuing the operating session if the user performs the authentication process after the operating session is suspended and the second predetermined time period is exceeded.

2. The method of claim 1 wherein the authentication process comprises:
   prompting the user to provide a login entry;
   receiving a login entry from the user;
   prompting the user to provide a password;
   receiving a password from the user; and
   verifying that the received login entry and password correspond to an authorized user.

3. The method of claim 1 further comprising providing a prompt that the operating session has been suspended.

4. The method of claim 3 wherein the prompt comprises displaying a plurality of icons.

5. The method of claim 3 wherein the prompt comprises entering a screen saver mode.

6. The method of claim 3 wherein the prompt comprises an audio signal.

7. The method of claim 1 wherein the authentication update process comprises inputting a predetermined signal to the user-operated device within the second predetermined time period.

8. The method of claim 7 wherein inputting a predetermined signal comprises selecting a predetermined icon displayed by the user-operated device.

9. The method of claim 7 wherein inputting a predetermined signal comprises selecting a predetermined character displayed by the user-operated device.

10. The method of claim 7 wherein inputting a predetermined signal comprises placing a cursor at a predetermined coordinate on a display of the user-operated device.

11. The method of claim 7 wherein inputting a predetermined signal comprises providing a predetermined audio voice signal to the user-operated device.

12. An apparatus for authorizing a user to operate a user-operated device, the apparatus comprising:
   means for authenticating a user to start an operating session;
   means for detecting when the user is not operating the user-operated device;
   means for suspending the operating session if the user has not operated the user-operated device for a first predetermined period; and
   means for updating authentication of the user and re-entering the operating session if the user updates authentication within a second predetermined time period, wherein the user updates the authentication by selecting at least two predetermined characters.

13. The apparatus of claim 12 wherein the means for authenticating comprises:
   means for prompting the user to provide a login entry;
   means for receiving a login entry from the user;
   means for prompting the user to provide a password;
   means for receiving a password from the user; and
   means for verifying that the received login entry and password correspond to an authorized user.

14. The apparatus of claim 12, further comprising means for providing a prompt that the operating session has been suspended.

15. The apparatus of claim 14 wherein the prompt comprises displaying a plurality of icons.

16. The apparatus of claim 14 wherein the prompt comprises entering a screen saver mode.

17. The apparatus of claim 14 wherein the prompt comprises an acoustic signal.

18. The apparatus of claim 12 wherein the means for updating authentication comprises means for receiving a predetermined signal from the user of the user-operated device.

19. The apparatus of claim 18 wherein the means for receiving a predetermined signal comprises means for selecting a predetermined icon displayed by the user-operated device.

20. The apparatus of claim 18 wherein the means for receiving a predetermined signal comprises means for selecting a predetermined character displayed by the user-operated device.

21. The apparatus of claim 18 wherein the means for receiving a predetermined signal comprises means for placing a cursor at a predetermined coordinate on a display of the user-operated device.

22. The apparatus of claim 18 wherein the means for receiving a predetermined signal comprises means for receiving a predetermined voice signal from the user of the user-operated device.

23. A device that is operable by a user during an operating session, the device comprising:
   a user interface configured to provide user-understandable signals and to receive signals from the user; and
   a control unit coupled to the user interface, wherein the control unit is configured to:
      perform an authentication process with the user, the authentication process determining whether a user attempting to operate the device is an authorized user, wherein an operating session is started if the control unit determines that the user is an authorized user, the device entering an authenticated mode,
      measure elapsed time from when the user last operated the device when the device is in the authenticated mode, the elapsed time being reset each time the user operates the device while the device is in the authenticated mode,
      suspend the authenticated operating session if the elapsed time measured by the user reaches a first predetermined value, the device entering a suspended mode,
      perform an authentication-update process with the user, wherein the authentication-update process comprises the user selecting at least two predetermined characters, the authentication-update process determining whether the user is an authorized user, wherein the device re-enters the authenticated mode to continue the operating session if the user completes the authentication-update process before the elapsed time reaches a second predetermined value, and if the elapsed time exceeds the second predetermined time period, perform the authentication process with the user before re-entering the authenticated mode to continue the operating session.

24. The device of claim 23 wherein the authentication process comprises:
prompting the user to provide a login entry;
receiving a login entry from the user;
prompting the user to provide a password;
receiving a password from the user; and
verifying that the received login entry and password correspond to an authorized user.

25. The device of claim 23 wherein the device is further configured to provide a prompt when the device enters the suspended mode.

26. The device of claim 25 wherein the prompt comprises displaying a plurality of icons.

27. The device of claim 25 wherein the prompt comprises entering a screen saver mode.

28. The device of claim 25 wherein the prompt comprises an audio signal.

29. The device of claim 23 wherein the authentication-update process comprises the user inputting a predetermined signal to the device through the user-interface within the second predetermined time period.

30. The device of claim 29 wherein inputting a predetermined signal comprises selecting a predetermined icon displayed by the device through the user-interface.

31. The device of claim 29 wherein inputting a predetermined signal comprises selecting a predetermined character displayed by the device through the user-interface.

32. The device of claim 29 wherein inputting a predetermined signal comprises placing a cursor at a predetermined coordinate on a display, the display being part of the user-interface.

33. The device of claim 29 wherein inputting a predetermined signal comprises providing a predetermined audio voice signal to the device through the user-interface.

34. The device of claim 29 wherein inputting a predetermined signal comprises the user looking at a predetermined character at a location displayed on the user-interface, the user interface being configured to determine the location on the user-interface at which the user is looking.

35. A method of authorizing a user to operate a user-operated device, the method comprising:
performing an authentication process to start an operating session;
detecting when the user is not operating the user-operated device;
suspending the operating session if the user has not operated the user-operated device for a first predetermined period;
continuing the operating session if the user performs an authentication-update process within a second predetermined time period after the operating session is suspended, wherein the authentication-update process comprises the user inputting two predetermined characters; and
continuing the operating session if the user performs the authentication process after the operating session is suspended and the second predetermined time period is exceeded.

36. The method of claim 35 wherein the authentication-update process further comprises inputting from a keyboard a predetermined signal from the user within the second predetermined time period.

* * * * *